US008358825B2

(12) United States Patent
Matsuura et al.

(10) Patent No.: US 8,358,825 B2
(45) Date of Patent: Jan. 22, 2013

(54) MONEY HANDLING SYSTEM

(75) Inventors: Shinji Matsuura, Tokyo-To (JP); Masanori Nose, Tokyo-To (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 286 days.

(21) Appl. No.: 12/736,309

(22) PCT Filed: Mar. 31, 2008

(86) PCT No.: PCT/JP2008/056339
§ 371 (c)(1), (2), (4) Date: Sep. 28, 2010

(87) PCT Pub. No.: WO2009/122500
PCT Pub. Date: Oct. 8, 2009

(65) Prior Publication Data
US 2011/0019901 A1 Jan. 27, 2011

(51) Int. Cl.
*G06K 9/00* (2006.01)

(52) U.S. Cl. .......................................................... 382/135

(58) Field of Classification Search ............ 382/135–14; 194/4–7; 235/379–381; 209/534–538; 356/71–73; 902/7–10
See application file for complete search history.

(56) References Cited

U.S. PATENT DOCUMENTS 6,328,166 B1 12/2001 Sakai ............................ 209/534
6,464,221 B1 10/2002 Hishinuma et al.
2004/0083176 A1 4/2004 Utz et al.

FOREIGN PATENT DOCUMENTS

EP 1 035 520 A1 9/2000
JP 06-012549 1/1994
JP 06-086866 3/1994
JP 2000-259882 9/2000
JP 2002-197505 7/2002

OTHER PUBLICATIONS

European Search Report (dated Apr. 29, 2011—7 pages).

*Primary Examiner* — Atiba O Fitzpatrick
(74) *Attorney, Agent, or Firm* — Renner, Kenner, Greive, Bobak, Taylor & Weber

(57) ABSTRACT

In order to intuitively inform a reject reason, a money handling system 100 includes: a reception unit configured to take banknotes one by one thereinto; a recognition unit configured to recognize the banknotes taken by the reception unit; a stacking unit configured to stack banknotes; a reject unit configured to stack rejected banknotes; a reject light-emitting unit configured to emit light in a plurality of manners; a transport unit configured to transport the banknotes taken by the reception unit to the stacking unit or the reject unit; and a control unit configured to control the reject light-emitting unit to emit light in a manner that differs from one reject reason to another reject reason of a rejected banknote, when the rejected banknote is recognized by the recognition unit.

13 Claims, 7 Drawing Sheets

| RECOGNITION RESULT OF NORMAL BANKNOTE | |
|---|---|
| DENOMINATION | NUMBER |
| $10 | 100 |
| $20 | 20 |
| : | : |

| RECOGNITION RESULT OF REJECT BANKNOTE | | |
|---|---|---|
| REJECT REASON | | NUMBER |
| UNRECOGNIZABLENESS | | 3 |
| ABNORMAL TRANSPORT | SKEW | 3 |
| | CHAIN | 2 |
| | OVERLAP | 1 |
| UNSPECIFIED DENOMINATION | | 5 |
| UNSPECIFIED DIRECTION | | 10 |
| UNFIT NOTE | DAMAGE | 3 |
| | STAIN | 2 |
| | : | : |
| COUNTERFEIT NOTE | MAGNETIC | 1 |
| | INFRARED | 1 |
| | : | : |

RECOGNITION DATA 101B

FIG. 3

| | | |
|---|---|---|
| LIGHT-EMITTING MODE (1) | SINGLE MODE | |
| | PREDETERMINED NUMBER MODE (10) | |
| LIGHT-EMITTING MODE (2) | LARGEST NUMBER MODE | |
| | PRIORITY ORDER MODE<br>COUNTERFEIT NOTE > UNIFIT NOTE > NON-DESIGNATED DENOMINATION > NON-DESIGNATED DIRECTION | |
| COUNTERFEIT-NOTE LIGHT-EMITTING SETTING | ON | OFF |
| TAKING-OPERATION STOPPING SETTING | ON | OFF |

| | REJECT REASON | | MANNER | | |
|---|---|---|---|---|---|
| | | | COLOR | MODULE | BLINKING RATE |
| LIGHT-EMITTING MANNER | ABNORMAL TRANSPORT | CHAIN | BLUE | A | 0 (LIGHTING) |
| | | SKEW | | | |
| | | OVERLAP | | | |
| | NON-DESIGNATED | DIRECTION | LIGHT BLUE | B | 0 (LIGHTING) |
| | | DENOMINATION | GREEN | C | 0 (LIGHTING) |
| | ABNORMAL RECOGNITION | INCAPABLE JUDGMENT | – | – | – |
| | ABNORMAL AUTHENTIFI-CATION | COUNTERFEIT-NOTE DITECTION A | YELLOW | D | 1 (LIGHTING) |
| | | COUNTERFEIT-NOTE DITECTION B | RED | E | 2 (LIGHTING) |
| | REJECT-UNIT FULL | REJECT-UNIT FULL DITECTION | YELLOW | E | 0 (LIGHTING) |

SET DATA 101C

F I G. 4

MONEY HANDLING SYSTEM

FIELD OF THE INVENTION

The present invention relates to a money handling system. In particular, the present invention relates to a money handling system configured to perform a deposit process for recognizing and counting banknotes, and to perform a sort process for counting only predetermined banknotes.

BACKGROUND ART

A money handling system configured to perform a deposit process of banknotes and a sort process of banknotes conventionally includes a stacking unit for stacking recognized and counted banknotes, and a reject unit for stacking rejected banknotes (banknotes unable to be recognized or banknotes not to be counted). In the deposit process and the sort process, banknotes are recognized, and the number of the banknotes is counted for each denomination. At this time, the banknotes falling under predetermined reject reasons (unspecified denomination, unspecified direction (front or back, orientation), unfit note and counterfeit note) are judged as banknotes to be rejected, and transported to the reject unit. Namely, the rejected banknotes that have been rejected for various reject reasons are stacked in the reject unit.

For example, as a conventional money handling system, a money handling system disclosed in JP2000-259895A has been known. The money handling system includes display units disposed on respective stacking units, and a body display unit disposed on a body. The respective display units display denominations, front or back, and fit or unfit of banknotes to be accommodated in the corresponding stacking units, and information (denomination, number and sum) of actually accommodated banknotes. Since each stacking unit has the display unit, an operator can understand information about the banknotes accommodated in the corresponding stacking units, simply by seeing the display unit.

However, in the conventional money handling system, only the stacking unit for stacking recognized and counted banknotes is equipped with the display unit, but the reject unit for stacking rejected banknotes is not equipped with the display unit. Thus, information about the banknotes stacked in the stacking unit and reject reasons of the rejected banknotes are displayed on the body display unit, and/or the contents to be displayed are displayed as characters. Therefore, when the operator takes out the rejected banknotes from the reject unit, the operator cannot know the reject reasons intuitively.

For example, in a case of a continuous deposit process, in which a designated denomination is specified, only banknotes of designated denomination are stacked in the stacking unit, banknotes of non-designated denomination are once stacked in the reject unit, and another designated denomination is again specified so as to again deposit the banknotes stacked in the reject unit, banknotes of non-designated denomination and counterfeit notes are stacked in the reject unit in a randomly mixed manner. Thus, it is not known whether a counterfeit note is included in the banknotes stacked in the reject unit. Therefore, by intuitively informing the operator of the reject reason, i.e., the non-designated denomination reason or the counterfeit note reason, efficiency in processes such as a deposit process and a sort process of the money handling system can be improved.

DISCLOSURE OF THE INVENTION

The present invention has been made in view of the above circumstances. According to the present invention, it is possible to intuitively inform a reject reason, whereby efficiency in processes such as a deposit process and a sort process of a money handling system can be improved.

According to a first aspect of the present invention, there is provided a money handling system including: a reception unit configured to take banknotes one by one thereinto; a recognition unit configured to recognize the banknotes taken by the reception unit; a stacking unit configured to stack banknotes; a reject unit configured to stack rejected banknotes; a reject light-emitting unit configured to emit light in a plurality of manners; a transport unit configured to transport the banknotes taken by the reception unit to the stacking unit or the reject unit; and a control unit configured to control the reject light-emitting unit to emit light in a manner that differs from one reject reason to another reject reason of a rejected banknote, when the reject banknote is recognized by the recognition unit.

In the present invention, it is preferable that, when the predetermined number of banknotes having the same reject reason is recognized by the recognition unit, the control unit is configured to control the reject light-emitting unit to emit light in a manner corresponding to the reject reason.

In the present invention, it is preferable that, when the control unit controls the reject light-emitting unit, the control unit is configured to control the reception unit such that the taking operation of banknotes is temporarily stopped.

In the present invention, it is preferable that for each time when a banknote having a reject reason is recognized by the recognition unit and is transported to the reject unit, the control unit is configured to control the reject light-emitting unit to emit light in a manner corresponding to the reject reason.

In the present invention, there is further provided a storage unit configured to store a recognition result of the recognition unit, wherein, when the taking operation performed by the reception unit is stopped, the control unit is configured to control the reject light-emitting unit to emit light in a manner corresponding to a reject reason for the largest number of banknotes among the reject reasons for the rejected banknotes stacked in the reject unit, based on the recognition result stored in the storage unit.

In the present invention, there is further provided a storage unit configured to store a recognition result of the recognition unit and a priority order of the reject reasons, wherein, when the taking operation performed by the reception unit is stopped, the control unit is configured to control the reject light-emitting unit to emit light in a manner corresponding to the reject reason of top priority among the reject reasons for a rejected banknotes stacked in the reject unit, based on the recognition result and the priority order stored in the storage unit.

In the present invention, it is preferable that, when a counterfeit banknote is recognized by the recognition unit, the control unit is configured to control the reject light-emitting unit to continuously emit light in a manner showing the counterfeit banknote.

In the present invention, it is preferable that the control unit is configured to control the reject light-emitting unit to continuously emit light in a manner corresponding to a reason of the counterfeit banknote.

In the present invention, it is preferable that, when a counterfeit bank note is recognized by the recognition unit, the control unit is configured to control the reject light-emitting unit to emit light in a manner showing the counterfeit banknote and in a manner corresponding to another reject reason.

In the present invention, it is preferable that the reject light-emitting unit includes a plurality of light-emitting modules corresponding to the respective reject reasons, and that the control unit is configured to control the reject light-emitting unit to emit light from a light-emitting module corresponding to the reject reason.

In the present invention, it is preferable that the reject light-emitting unit includes a light-emitting module capable of emitting light of a plurality of colors, and that the control unit is configured to control the reject light-emitting unit to emit light of a color corresponding to the reject reason.

In the present invention, it is preferable that the reject light-emitting unit includes a light-emitting module capable of emitting light at a plurality of blinking rates, and that the control unit is configured to control the reject light-emitting unit to emit light at a blinking rate corresponding to the reject reason.

In the present invention, it is preferable that the reject light-emitting unit is configured to irradiate light to the banknotes stacked in the reject unit.

BRIEF DESCRIPTION OF THE DRAWINGS

FIG. 3 is a schematic view showing a data structure of recognition data 101B;

FIG. 4 is a schematic view showing a data structure of set data 101C;

BEST MODE FOR CARRYING OUT THE INVENTION

An example of the present invention will be described with reference to the drawings. The following example is one embodiment of the present invention, and does not limit the scope of the present invention.

The example of the present invention is a money handling system including a reject light-emitting unit configured to emit light in a manner corresponding to a reject reason.

Figure 1:
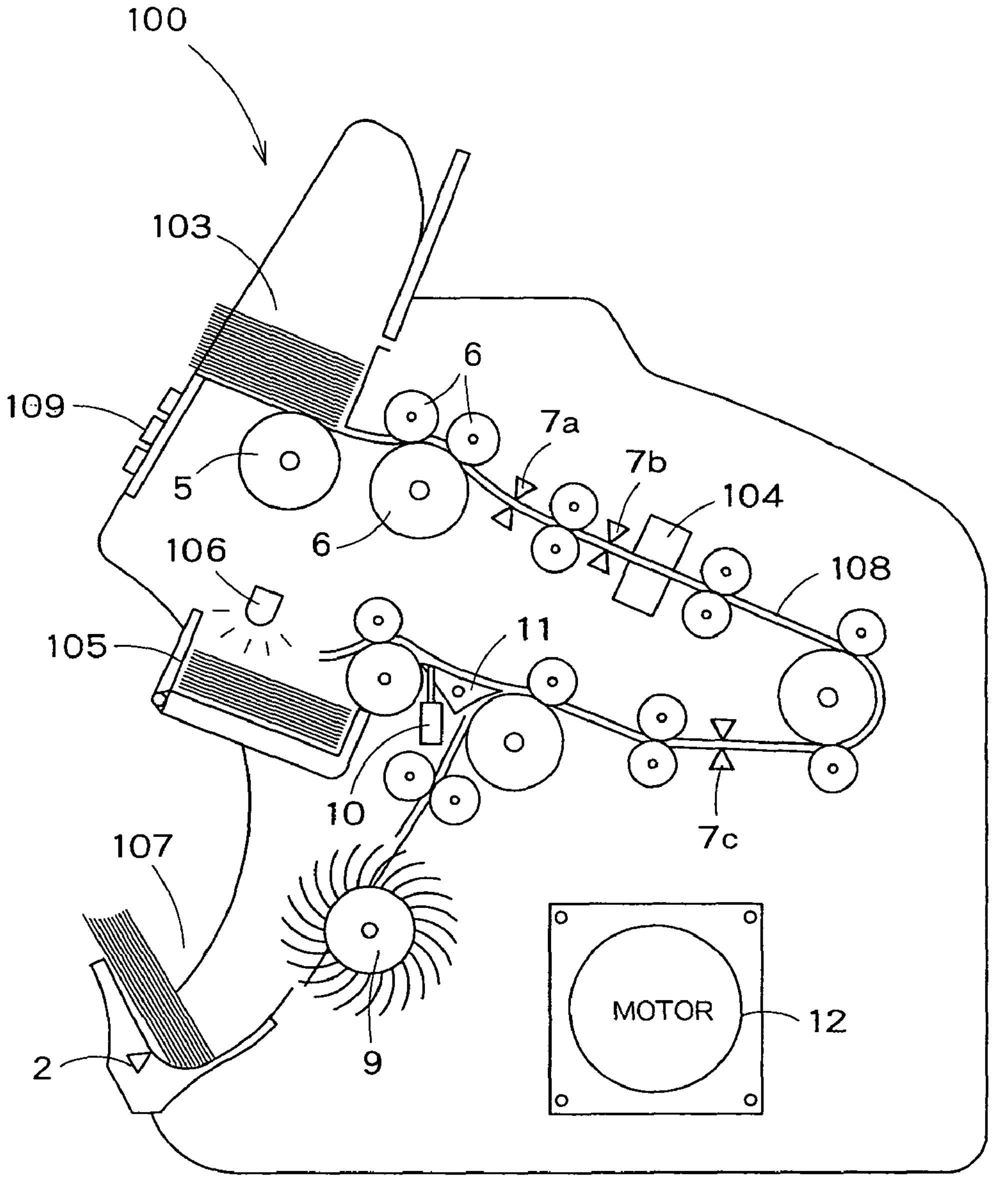
FIG. 1 is a schematic view showing an inside structure of a money handling system 100.
Figure 2:
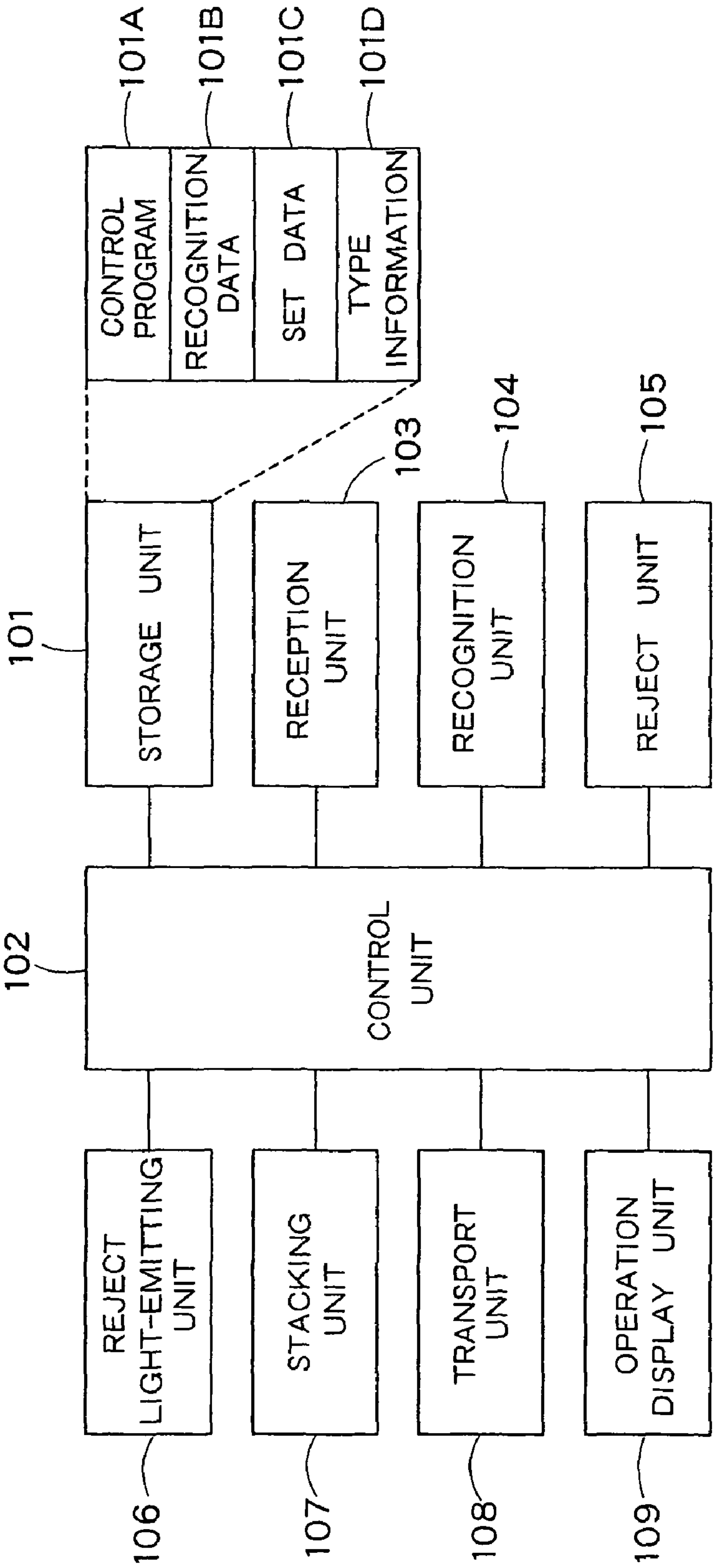
FIG. 2 is a block diagram showing a control block of the money handling system 100.

The structure of the money handling system 100 is firstly described with reference to FIGS. 1 and 2. FIG. 1 is a schematic view showing an inside structure of the money handling system 100. FIG. 2 is a block diagram showing a control block of the money handling system 100.

As shown in FIG. 1, the money handling system 100 includes a reception unit 103, a recognition unit 104, a reject unit 105, a reject light-emitting unit 106, a stacking unit 107, a transport unit 108, and an operation display unit 109. As shown in FIG. 2, the money handling system 100 further includes a storage unit 101 and a control unit 102.

The control unit 101 stores a control program 101A, recognition data 101B, set data 101C, and type information 101D. The storage unit 101 also functions as a working memory of the control unit 102.

The control unit 102 is connected to the respective units 101 and 103 to 109 of the money handling system 100. By activating the control program 101A stored in the storage unit 101, the control unit 102 is configured to control the respective units 103 to 109 of the money handling system 100. In addition, based on a recognition result (banknote type information, unrecognizableness, and abnormal transport) of the recognition unit 104 and the type information 101D about the banknotes to be counted, which is stored in the storage unit 101, the control unit 102 is configured to judge whether a banknote is a banknote to be transported to the stacking unit 107 (hereinafter referred to as "normal banknote") or a banknote to be transported to the reject unit 105 (hereinafter referred to as "banknote to be rejected (rejected banknote)"). The control unit 102 is configured to control the transport unit 108 such that a banknote, which has been judged as a normal banknote because its type information by the recognition result falls under the type information 101D that has been stored in the storage unit 101, is transported to the stacking unit 107, and that a banknote, which has been judged as a banknote to be rejected because its type information by the recognition result does not fall under the type information 101D that has been stored in the storage unit 101, is transported to the reject unit 105.

The reception unit 103 is configured to feed banknotes placed there into the money handling system 100 one by one.

The recognition unit 104 is configured to recognize the banknotes taken by the reception unit 103, and to write the recognition result as the recognition data 101B in the storage unit 101. As shown in FIG. 3, the recognition data 101B includes a recognition result of normal banknotes and a recognition result of reject banknotes. The recognition result of normal banknotes includes a denomination and the number of banknotes. The recognition result of reject banknotes includes a reject reason and the number of banknotes. The reject reason may be an unrecognizableness, an abnormal transport (skew, chain, overlap), a non-designated denomination, a non-designated direction (front and back, orientation), an unfit note (including the number of banknotes for each reason such as damage or stain), and/or a counterfeit note (including the number of banknotes for each reason such as a detection sensor type). The reject reasons such as the non-designated denomination and the non-designated direction are written as the recognition data 101B in the storage unit 101 by the control unit 102.

The reject unit 105 is configured to stack banknotes which have been judged as reject banknotes by the control unit 102.

The reject light-emitting unit 106 includes a light-emitting module (such as an LED) that emits light in a manner corresponding to a reject reason of the reject banknotes stacked in the reject unit 105. The reject light-emitting unit 106 may be disposed on the reject unit 105 or at a location near thereto, so as to irradiate light to the reject banknotes stacked in the reject unit 105. Alternatively, the reject light-emitting unit 106 may be provided with a plurality of light-emitting modules, wherein a light-emitting module corresponding to a reject reason emits light. Alternatively, the reject light-emitting unit 106 may be provided with a light-emitting module capable of emitting light of a plurality of colors, wherein the light-emitting module emits light of a color corresponding to a reject reason. Alternatively, the reject light-emitting unit 106 may be provided with a light-emitting module capable of emitting light at a plurality of blinking rates, wherein the light-emitting module emits light at a blinking rate corresponding to a reject result. The plurality of light-emitting modules of the reject light-emitting unit 106 may be disposed on one surface (for example, below the operation display unit 109) of the money handling system 100.

The stacking unit 107 is configured to stack banknotes which have been judged as normal banknotes by the control unit 102.

The transport unit 108 is configured to transport the banknotes taken by the reception unit 103 to the stacking unit 107 or the reject unit 105, based on a control of the control unit 102.

The operation display unit 109 includes an operation mechanism (not shown) for receiving instruction from an operator, and a display mechanism (not shown) for displaying predetermined information to the operator. The operation display unit 109 is configured to receive instruction relating to settings of the money handling system 100, and to write the received contents as the set data 101C in the storage unit 101. As shown in FIG. 4, the set data 101C includes a "light-emitting mode (1)" to be referred to in the below-described control (1) of the reject light-emitting unit, a "light-emitting mode (2)" to be referred to in the below-described control (2) of the reject light-emitting unit, a "counterfeit-note light-emitting setting", a "taking-operation stopping setting", and a "light-emitting manner".

The "light-emitting mode (1)" includes a "single mode", a "predetermined number mode", and a "counterfeit-note mode". The "light-emitting mode (2)" includes a "largest number mode" and a "priority order mode". The "counterfeit-note light-emitting set" and the "taking-operation stopping set" can be set as "ON" or "OFF". The "light-emitting manner" includes manners ("color", "module", and "blinking rate") set for respective reject reasons ("abnormal transport", "non-designated (unspecified)", "abnormal recognition", "abnormal authentification", and "reject-unit full"). The "non-designated (unspecified)" and the "abnormal authentification" differ in manners for each reject reason.

Next, an operation of the money handling system 100 is described with reference to FIG. 1.

As shown in FIG. 1, banknotes placed into the reception unit 103 are taken one by one into the money handling system 100 by rotation of a feeding roller 5. The taken banknotes pass through the recognition unit 104 by rotation of transport rollers 6. At this time, denominations of the banknotes are recognized at a predetermined timing from a time point of detection by tracking sensors 7*a* and 7*b*. The banknotes having passed through the recognition unit 104 are transported to the reject unit 105 or the stacking unit 107 via a branch lever 11. At this time, the branch lever 11 is driven by a solenoid 10 at a predetermined timing from a time point of detection of another tracking sensor 7*c*. The banknotes judged as reject banknotes are diverged to be transported to the reject unit 105, and the recognized and counted banknotes are diverged to be transported to the stacking unit 107 via a stacking wheel 9. Light emitted from the reject light-emitting unit 106 in a predetermined manner is irradiated to the banknotes stacked in the reject unit 105. Remaining conditions of the banknotes stacked in the stacking unit 107 are detected by a remaining-condition detection sensor 2. The respective components are driven by a motor 12.

Figure 5:
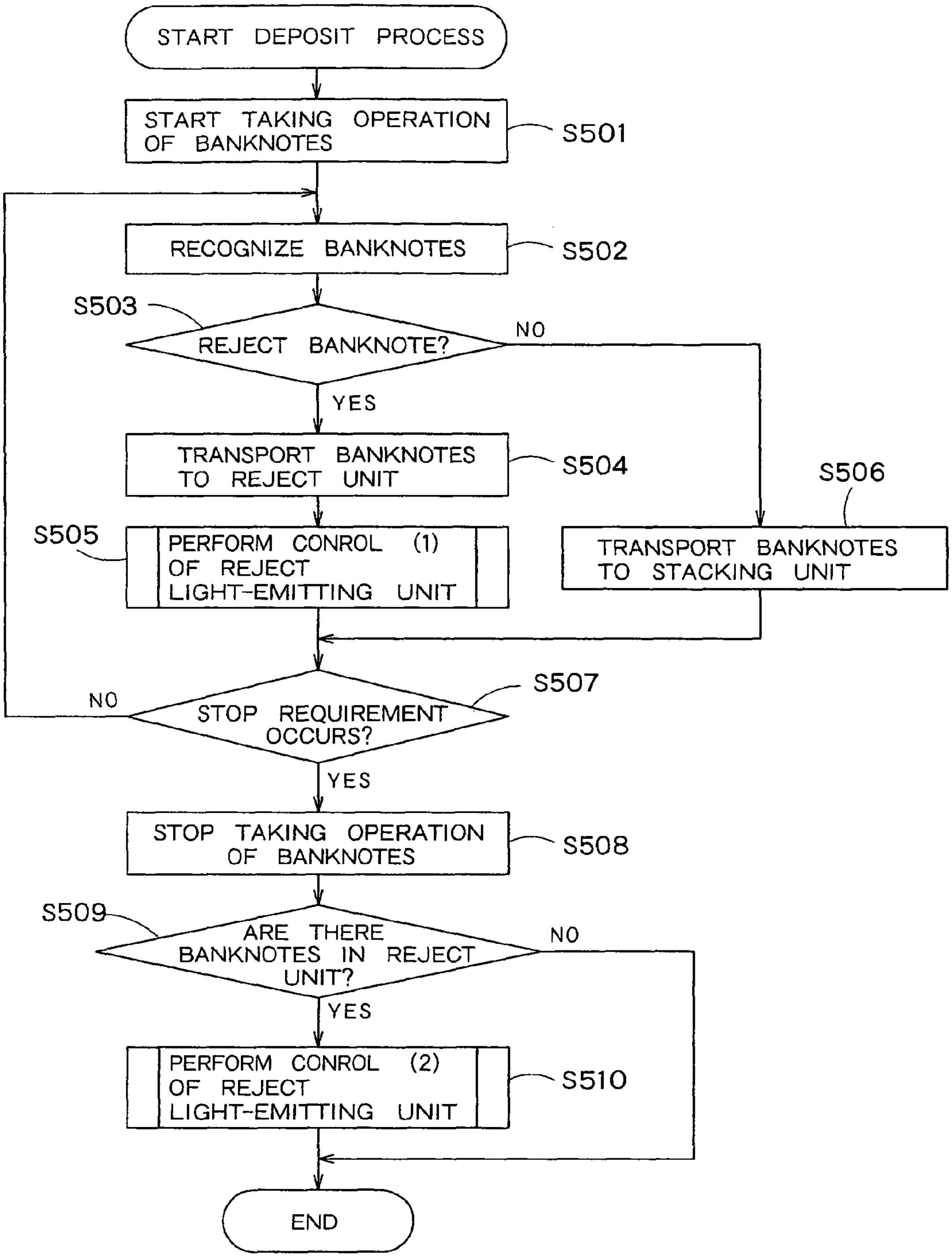
FIG. 5 is a flowchart showing a process procedure of a deposit process.

Next, process contents of the money handling system 100 are described with reference to FIGS. 5 to 7. FIG. 5 is a flowchart showing a process procedure of a deposit process.

At first, the reception unit 103 starts a taking operation for taking banknotes one by one into the money handling system 100 (S501).

Then, the recognition unit 104 recognizes the banknotes taken by the reception unit 103, and writes the recognition result as the recognition data 101B in the storage unit 101 (S502).

When the banknote is a banknote to be rejected whose recognition result in the step S502 does not fall under the type information 101D (S503-YES), the control unit 102 transports the banknote taken in the step S501 to the reject unit 105 (S504).

Then, the control unit 102 carries out the below-described control (1) of the reject light-emitting unit (S505).

On the other hand, when the banknote is a normal banknote whose recognition result in the step S502 falls under the type information 101D (S503-NO), the control unit 102 transports the banknote taken in the step S501 to the stacking unit 107 (S506).

The steps S502 to 506 are repeated until a stop requirement occurs (S507-NO).

When a stop requirement occurs (S507-YES), the reception unit 103 stops the taking operation of banknotes (S508). For example, when there remains no banknote in the reception unit 103, if a stop instruction is received by the operation display unit 109, or if a predetermined number of banknotes are stacked in the stacking unit 107, a stop requirement occurs.

Then, when there are banknotes in the reject unit 105 (S509-YES), the control unit 102 carries out the below-described control (2) of the reject light-emitting unit (S510).

The deposit process is finished, when there remains no banknote in the reject unit 105 (S509-NO) or after the step S510.

Figure 6:
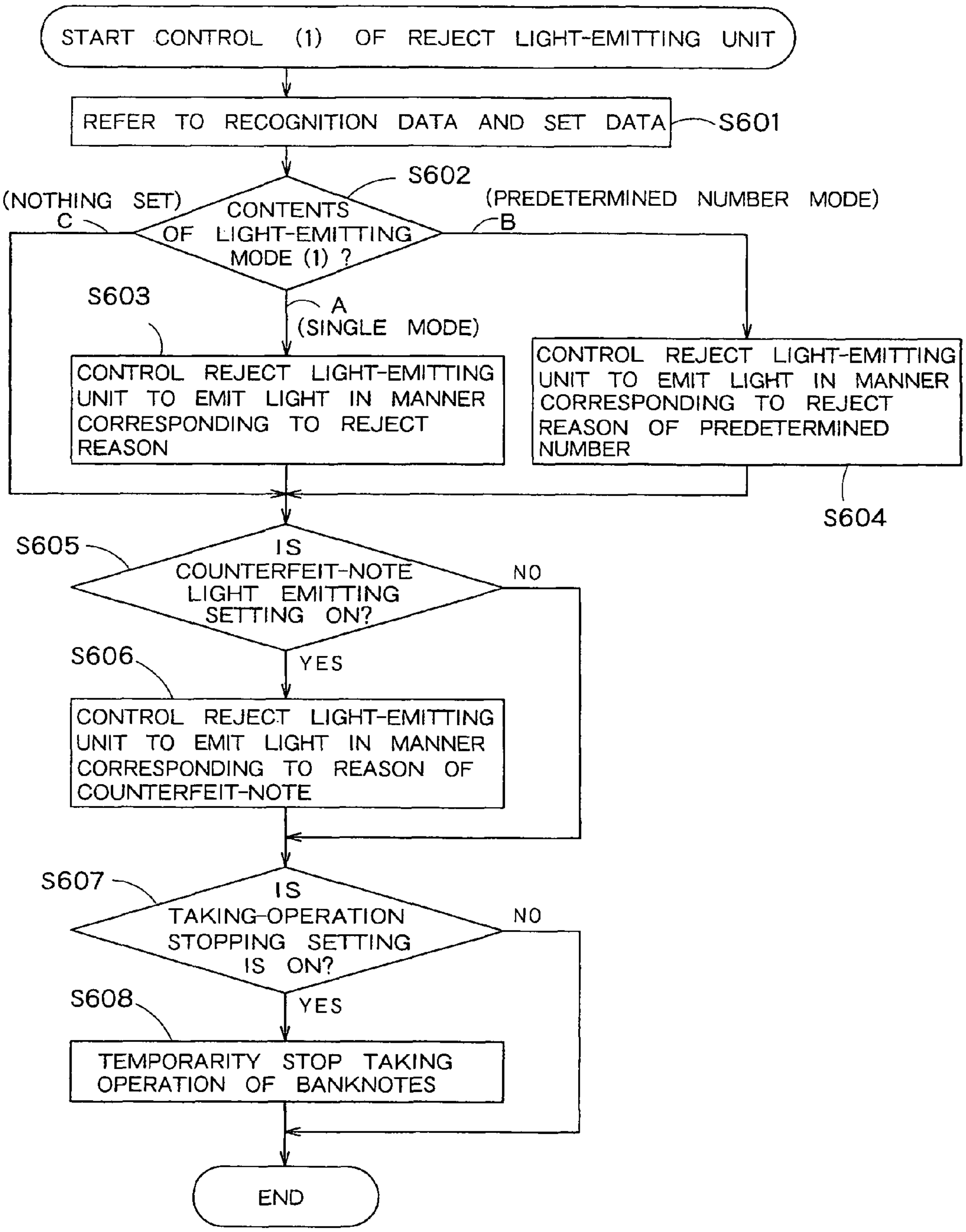
FIG. 6 is a flowchart showing a process procedure of a control (1) of a reject light-emitting unit.

FIG. 6 is a flowchart showing a process procedure of the control (1) of the reject light-emitting unit. The control (1) of the reject light-emitting unit is carried out for each time a reject banknote is transported to the reject unit 105.

At first, the control unit 102 refers to the recognition data 101B and the set data 101C stored in the storage unit 101 (S601).

When the "light-emitting mode (1)" of the set data 101C is the "single mode" (S602-A), the control unit 102 controls the reject light-emitting unit 106 to emit light in a manner corresponding to a reject reason (S603). For example, the "single mode" is selected when the banknote falls under the "reject-unit full" of the "light-emitting manner" shown in FIG. 4.

On the other hand, when the "light-emitting mode (1)" of the set data 101C is the "predetermined number mode" (S602-B), the control unit 102 controls the reject light-emitting unit 106 to emit light in a manner corresponding to a reject reason in which the "number" of the "recognition result of reject banknote" of the recognition data 101B reaches the predetermined number shown by the "predetermined number mode" (S604). For example, the "predetermined number mode" is selected when the banknote falls under the "abnormal transport" or the "non-designated (unspecified)" of the "light-emitting manner" shown in FIG. 4.

After the step S603 or S604, or when the "light-emitting mode (1)" of the set data 101C is not set (S602-C) and the "counterfeit-note light-emitting set" of the set data 101C is "ON" (S605-YES), the control unit controls the reject light-emitting unit 106 to emit light in a manner corresponding to a reason of the counterfeit note (S606).

When the counterfeit-note light-emitting set is "OFF" (S605-NO), or after the step S606 and when "taking-operation stopping set" of the set data 101C is "ON" (S607-YES), the reception unit 103 stops the taking operation of banknotes (S608). When the reject banknotes stacked in the reject unit 105 are again received into the reception unit 103, the temporary stop is released.

The control (1) of the reject light-emitting unit is finished, when the "taking-operation stopping set" of the set data 101C is turned "OFF" or after the step S608.

Figure 7:
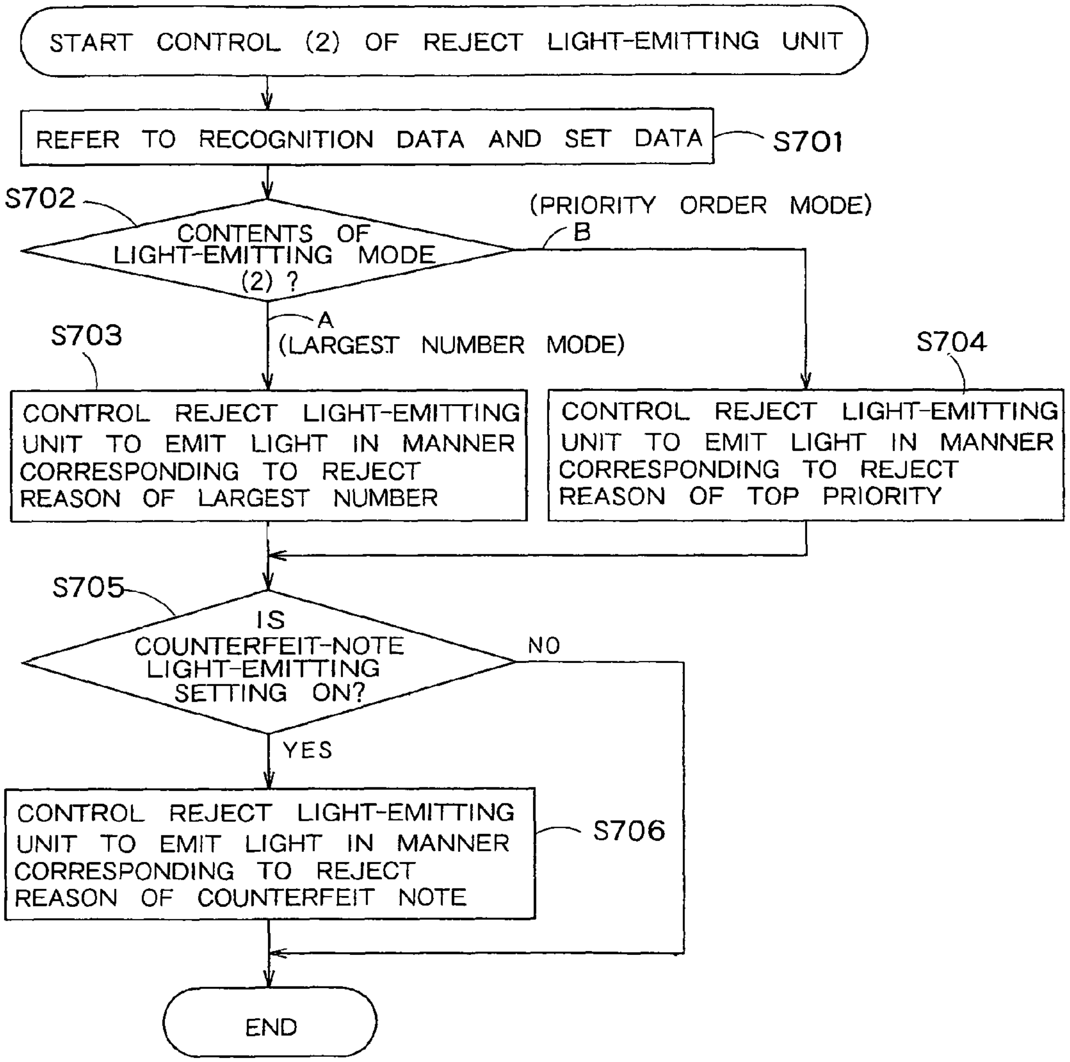
FIG. 7 is a flowchart showing a process procedure of a control (2) of the reject light-emitting unit.

FIG. 7 is a flowchart showing a process procedure of the control (2) of the reject light-emitting unit. The control (2) of the reject light-emitting unit is a process that is carried out after the taking operation of banknotes by the reception unit 103 has been stopped.

At first, the control unit 102 refers to the recognition data 101B and the set data 101C stored in the storage unit 101 (S701).

When the "light-emitting mode (2)" of the set data 101C is the "largest number mode" (S702-A), the control unit 102 controls the reject light-emitting unit 106 to emit light in a manner corresponding to a reject reason of the largest number of banknotes (S703).

On the other hand, when the "light-emitting mode (2)" of the set data 101C is the "priority order mode" (S702-B), the control unit 102 controls the reject light-emitting unit 106 to emit light in a manner corresponding to a reject reason of top priority (S704).

When the "counterfeit-note light-emitting set" of the set data 101C is "ON" (S705-YES), the control unit 102 controls the reject light-emitting unit 106 to emit light in a manner corresponding to a reason of the counterfeit note (S706).

The control (2) of the reject light-emitting unit is finished, when the "counterfeit-note light-emitting set" of the set data 101C is turned "OFF" (S705-NO) or after the step 706.

In this example, when the control unit 102 controls the reject light-emitting unit 106, characters or images representing a reject reason may be displayed on the operation display unit 109.

In addition, in this example, the reject light-emitting unit 106 may emit light once for each time a reject banknote is stacked in the reject unit 105, or emit light continuously.

According to this example, since the reject light-emitting unit 106 emits light in a manner corresponding to a reject reason, it is possible to intuitively inform of the reject reason, whereby efficiency in processes such as a deposit process and a sort process of the money handling system can be improved.

In addition, according to this example, since the reject light-emitting unit 106 can intuitively inform of a reject reason with the use of light, estimation of a succeeding operation can be facilitated, and operability of the money handling system 100 can be enhanced.

The invention claimed is:

1. A money handling system comprising:

a reception unit configured to take banknotes one by one thereinto;

a recognition unit configured to recognize the banknotes taken by the reception unit;

a stacking unit configured to stack banknotes;

a reject unit configured to stack rejected banknotes;

a reject light-emitting unit configured to emit light in a plurality of manners;

a transport unit configured to transport the banknotes taken by the reception unit to the stacking unit or the reject unit; and a control unit configured to control the reject light-emitting unit to emit light in a manner that differs from one reject reason of one rejected banknote to another reject reason of another rejected banknote, when the rejected banknote is recognized by the recognition unit.

2. The money handling system according to claim 1, wherein when the predetermined number of banknotes having the same reject reason is recognized by the recognition unit, the control unit is configured to control the reject light-emitting unit to emit light in a manner corresponding to the reject reason.

3. The money handling system according to claim 1, wherein when the control unit controls the reject light-emitting unit, the control unit is configured to control the reception unit such that the taking operation of banknotes is temporarily stopped.

4. The money handling system according to claim 1, wherein for each time when a banknote having a reject reason is recognized by the recognition unit and is transported to the reject unit, the control unit is configured to control the reject light-emitting unit to emit light in a manner corresponding to the reject reason.

5. The money handling system according to claim 1 further comprising a storage unit configured to store a recognition result of the recognition unit, wherein, when the taking operation performed by the reception unit is stopped, the control unit is configured to control the reject light-emitting unit to emit light in a manner corresponding to a reject reason for the largest number of banknotes among the reject reasons for the rejected banknotes stacked in the reject unit, based on the recognition result stored in the storage unit.

6. The money handling system according to claim 1 further comprising a storage unit configured to store a recognition result of the recognition unit and a priority order of the reject reasons, wherein, when the taking operation performed by the reception unit is stopped, the control unit is configured to control the reject light-emitting unit to emit light in a manner corresponding to the reject reason of top priority among the reject reasons for a rejected banknote stacked in the reject unit, based on the recognition result and the priority order stored in the storage unit.

7. The money handling system according to claim 1, wherein when a counterfeit banknote is recognized by the recognition unit, the control unit is configured to control the reject light-emitting unit to continuously emit light in a manner showing the counterfeit banknote.

8. The money handling system according to claim 7, wherein the control unit is configured to control the reject light-emitting unit to continuously emit light in a manner corresponding to a reason of the counterfeit banknote.

9. The money handling system according to claim 1, wherein when a counterfeit bank note is recognized by the recognition unit, the control unit is configured to control the reject light-emitting unit to emit light in a manner showing the counterfeit banknote and in a manner corresponding to another reject reason.

10. The money handling system according to claim 1, wherein the reject light-emitting unit includes a plurality of light-emitting modules corresponding to the respective reject reasons, and the control unit is configured to control the reject light-emitting unit to emit light from a light-emitting module corresponding to the reject reason.

11. The money handling system according to claim 1, wherein the reject light-emitting unit includes a light-emitting module capable of emitting light of a plurality of colors, and the control unit is configured to control the reject light-emitting unit to emit light of a color corresponding to the reject reason.

12. The money handling system according to claim 1, wherein the reject light-emitting unit includes a light-emitting module capable of emitting light at a plurality of blinking rates, and, the control unit is configured to control the reject light-emitting unit to emit light at a blinking rate corresponding to the reject reason.

13. The money handling system according to claim 1, wherein the reject light-emitting unit is configured to irradiate light to the banknotes stacked in the reject unit.

* * * * *